Aug. 12, 1952 — R. H. WEISNER — 2,606,581
DOVETAILING MACHINE
Filed March 11, 1947 — 10 Sheets-Sheet 3
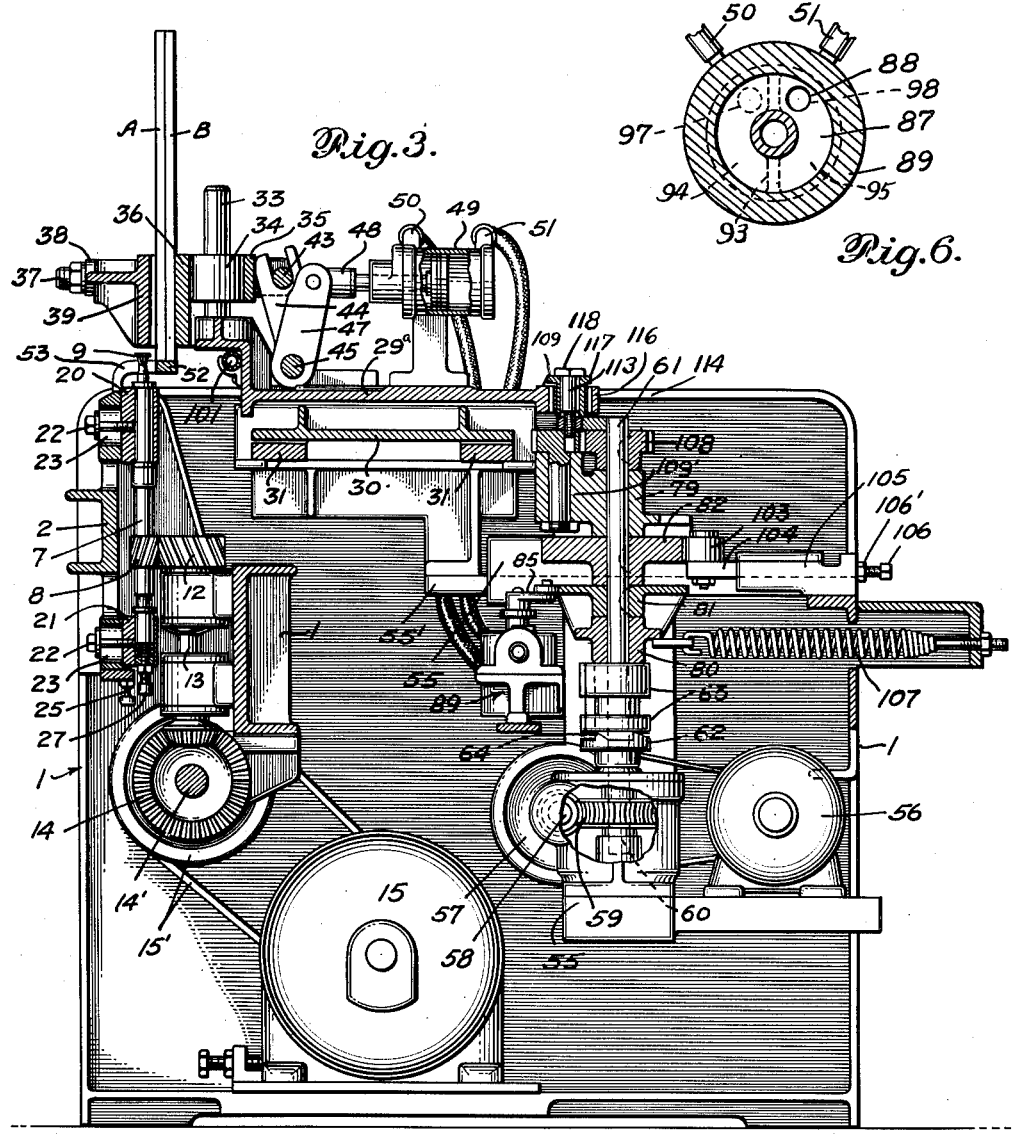
Fig. 3.
Fig. 6.
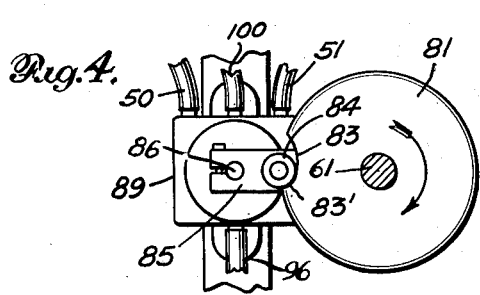
Fig. 4.
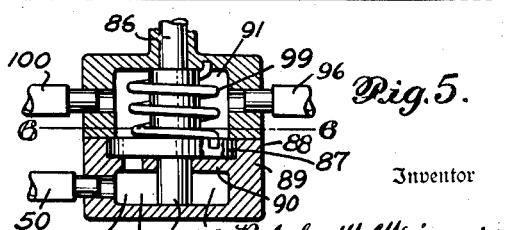
Fig. 5.
Inventor
Ralph H. Weisner,
Attorney

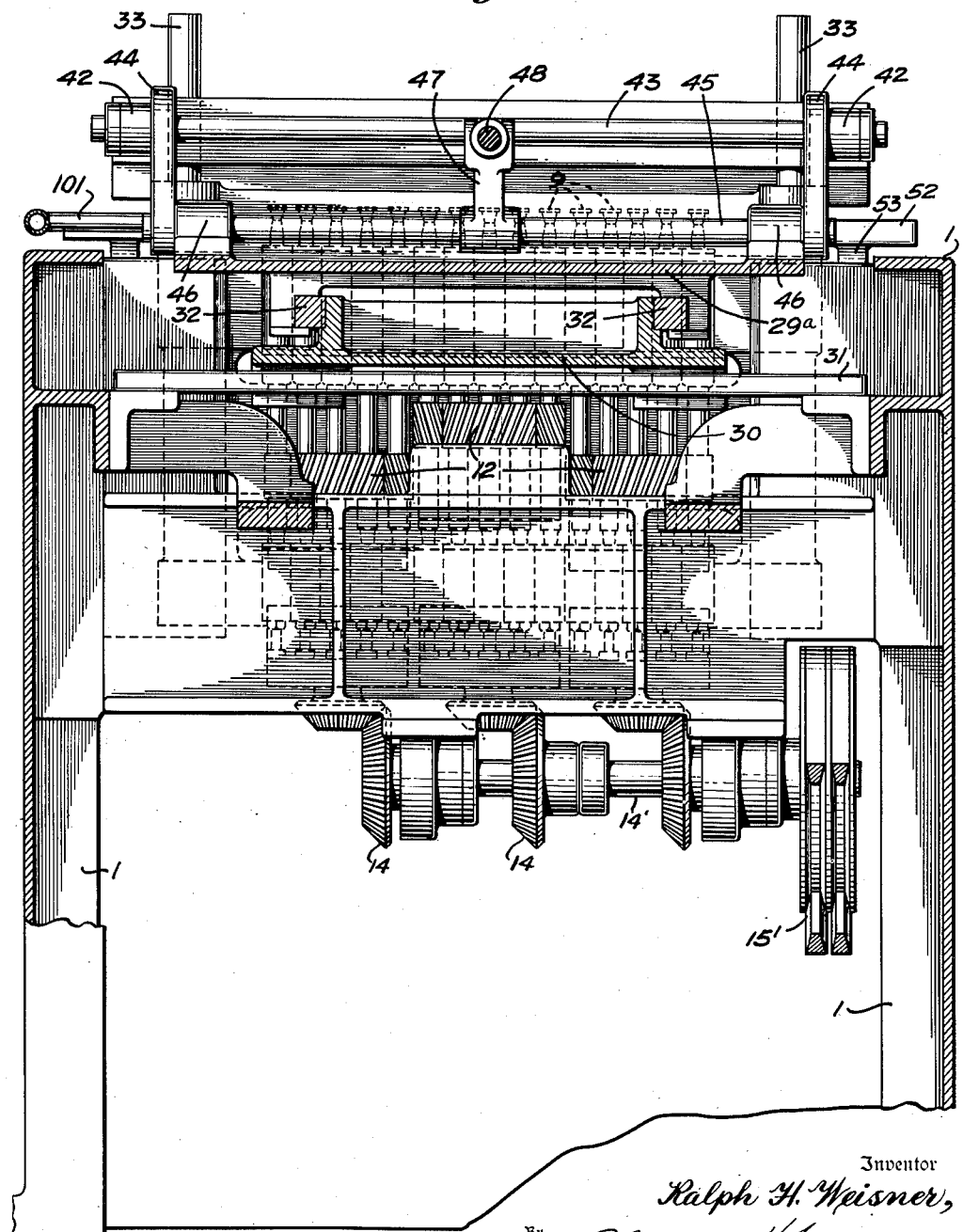

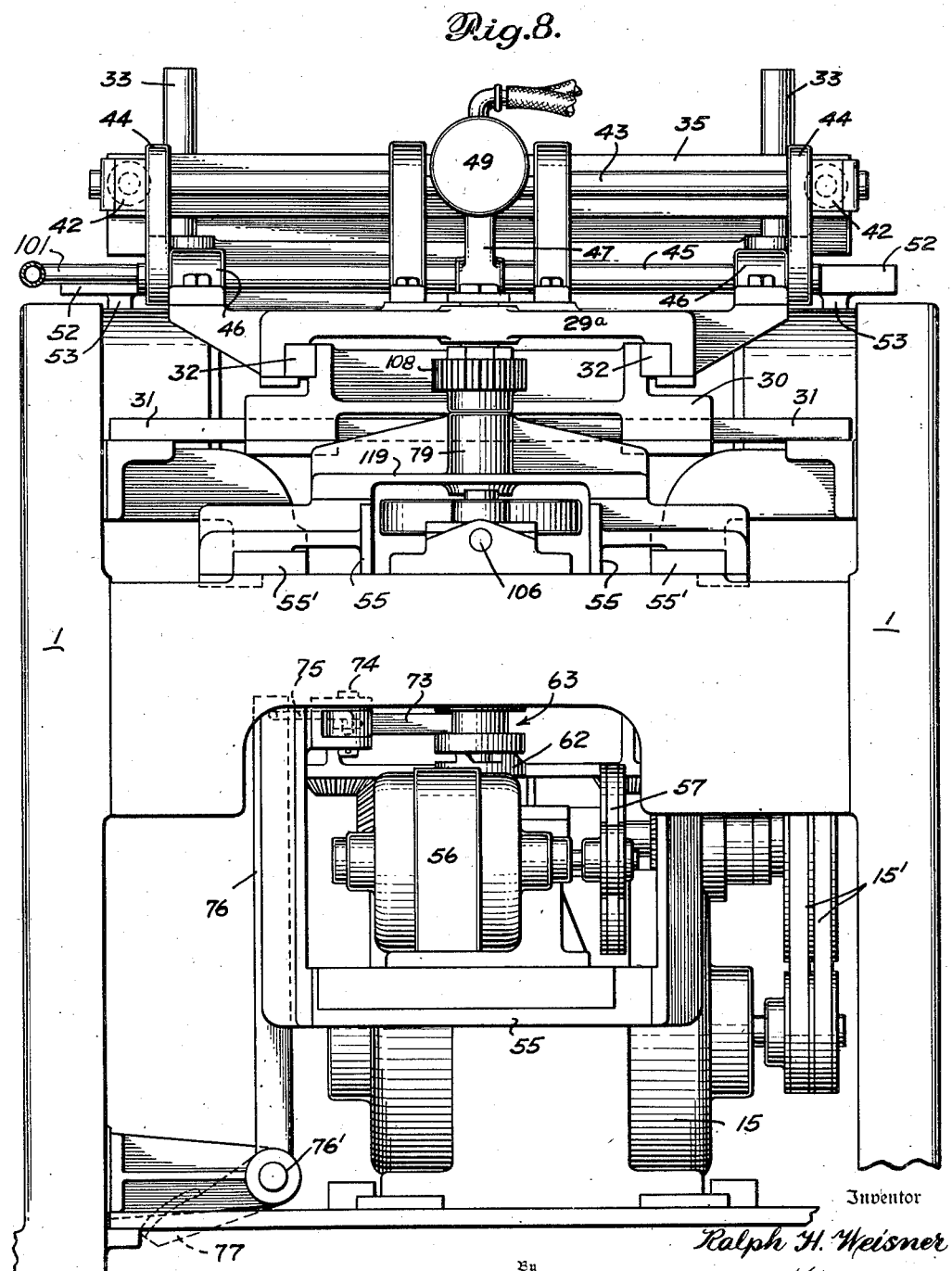

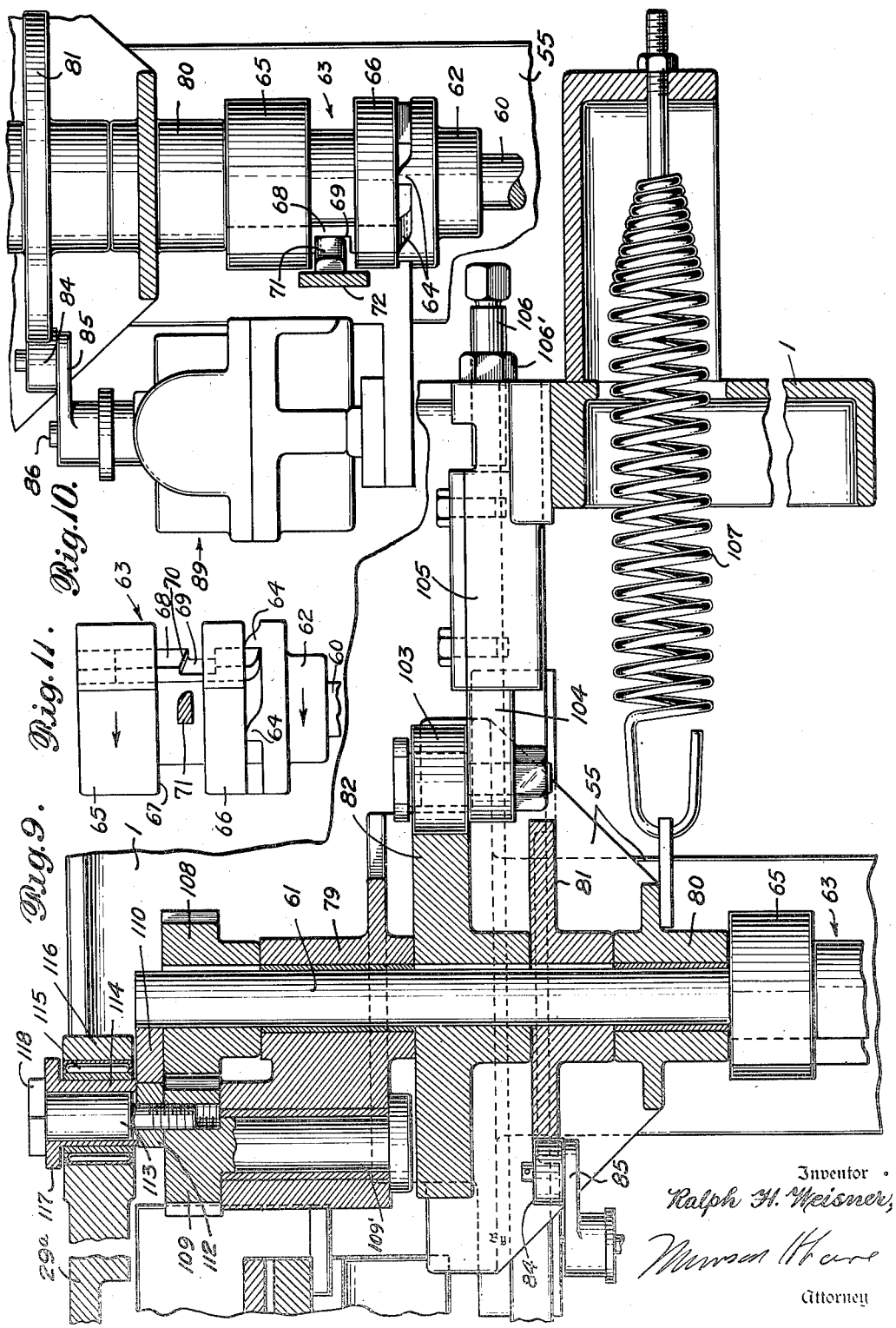

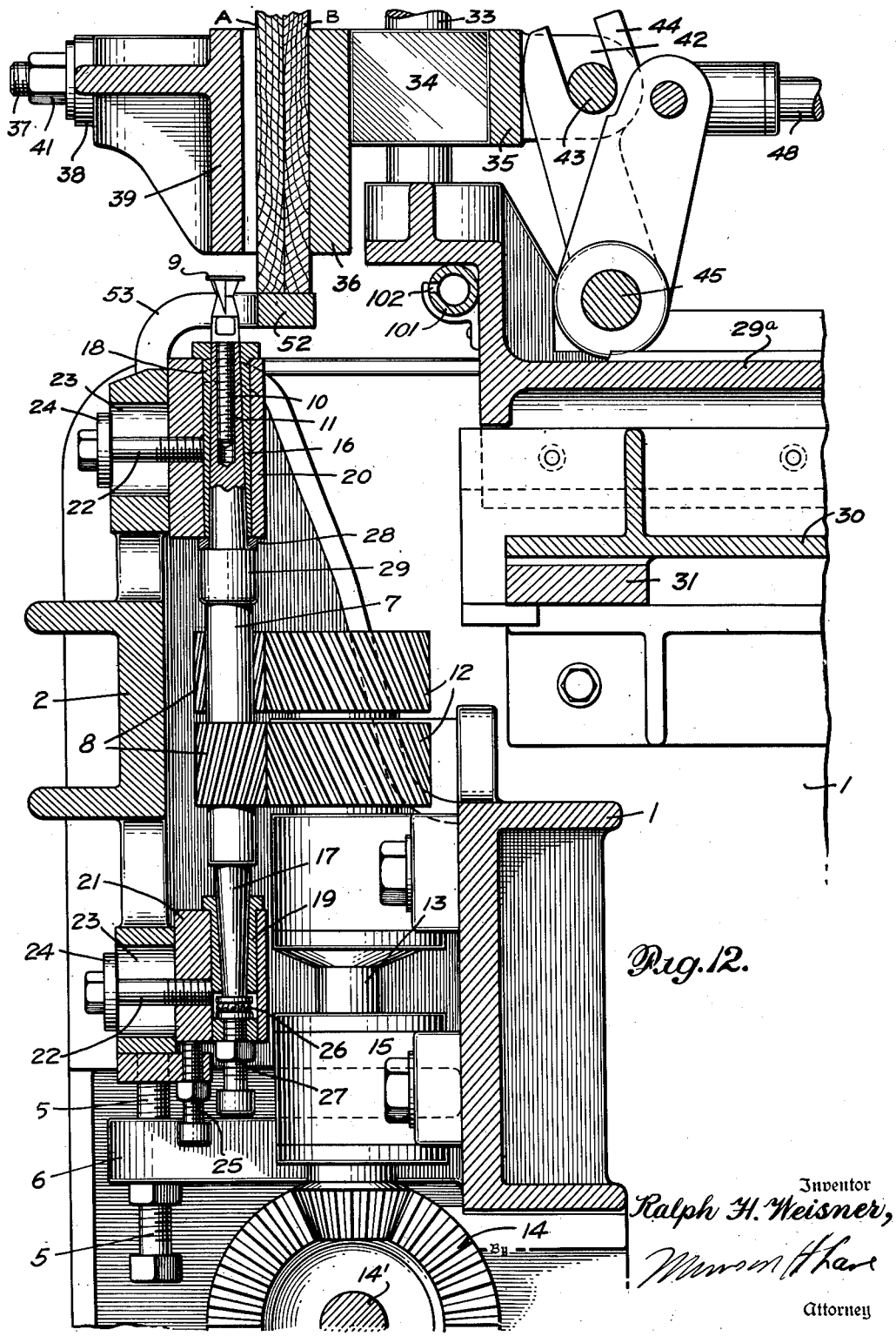

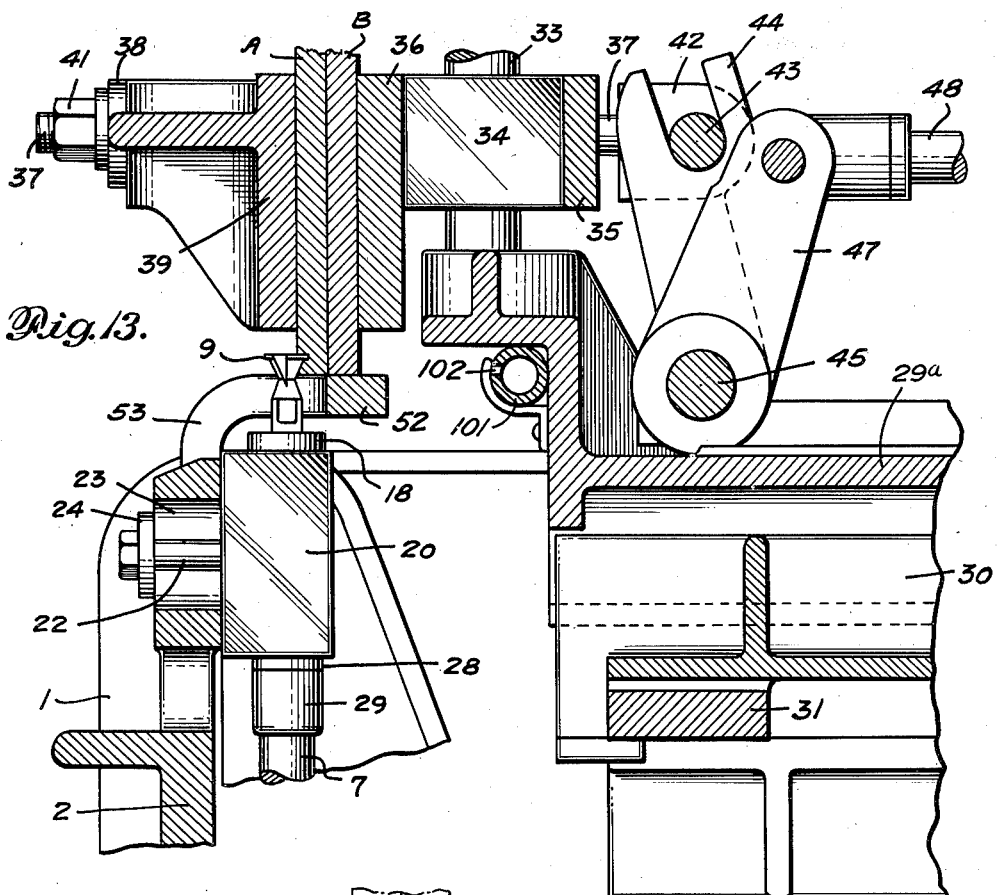
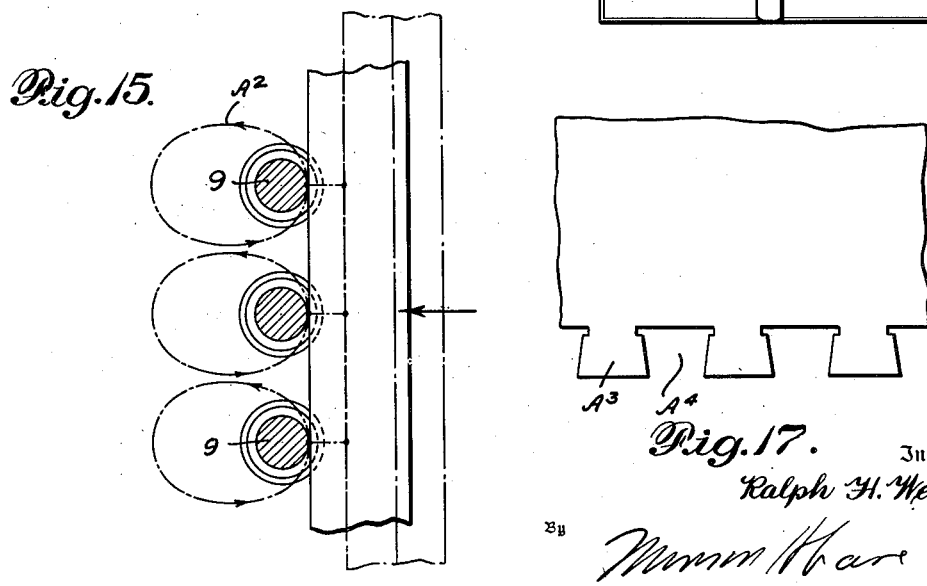

Aug. 12, 1952 R. H. WEISNER 2,606,581
DOVETAILING MACHINE
Filed March 11, 1947 10 Sheets-Sheet 9
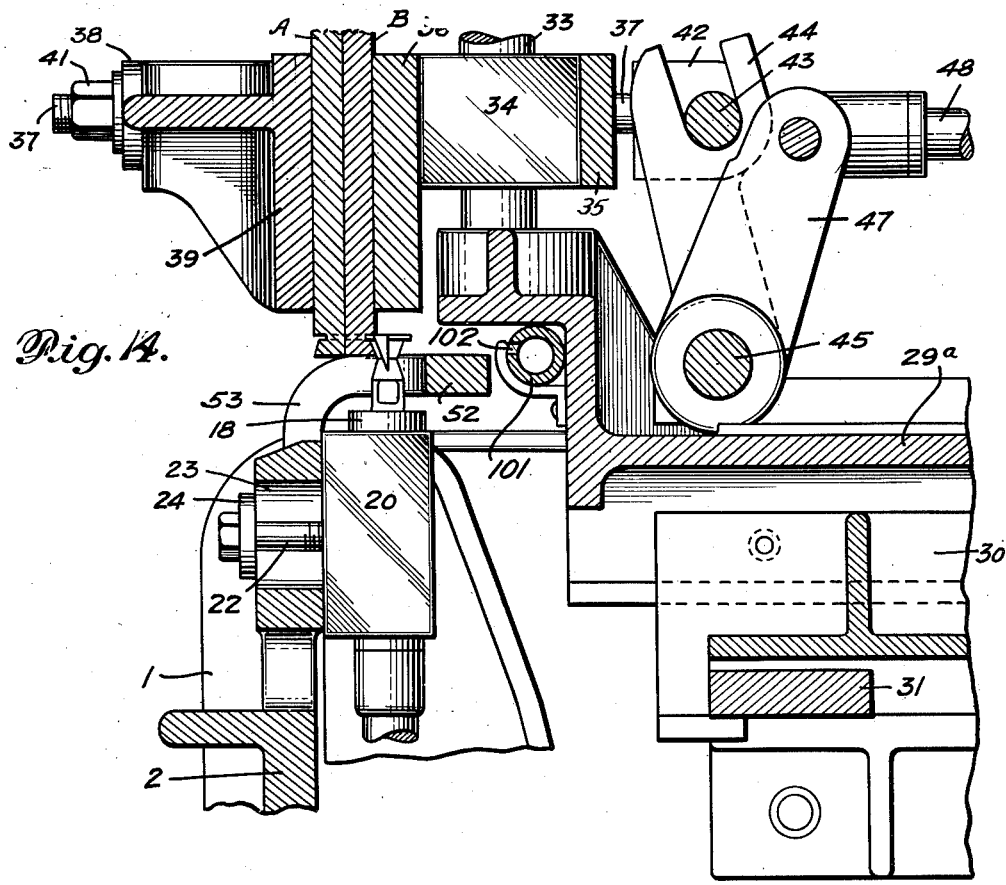
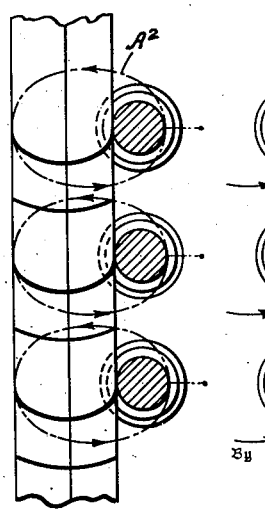
Inventor
Ralph H. Weisner,
By Munson H. Lane.
Attorney

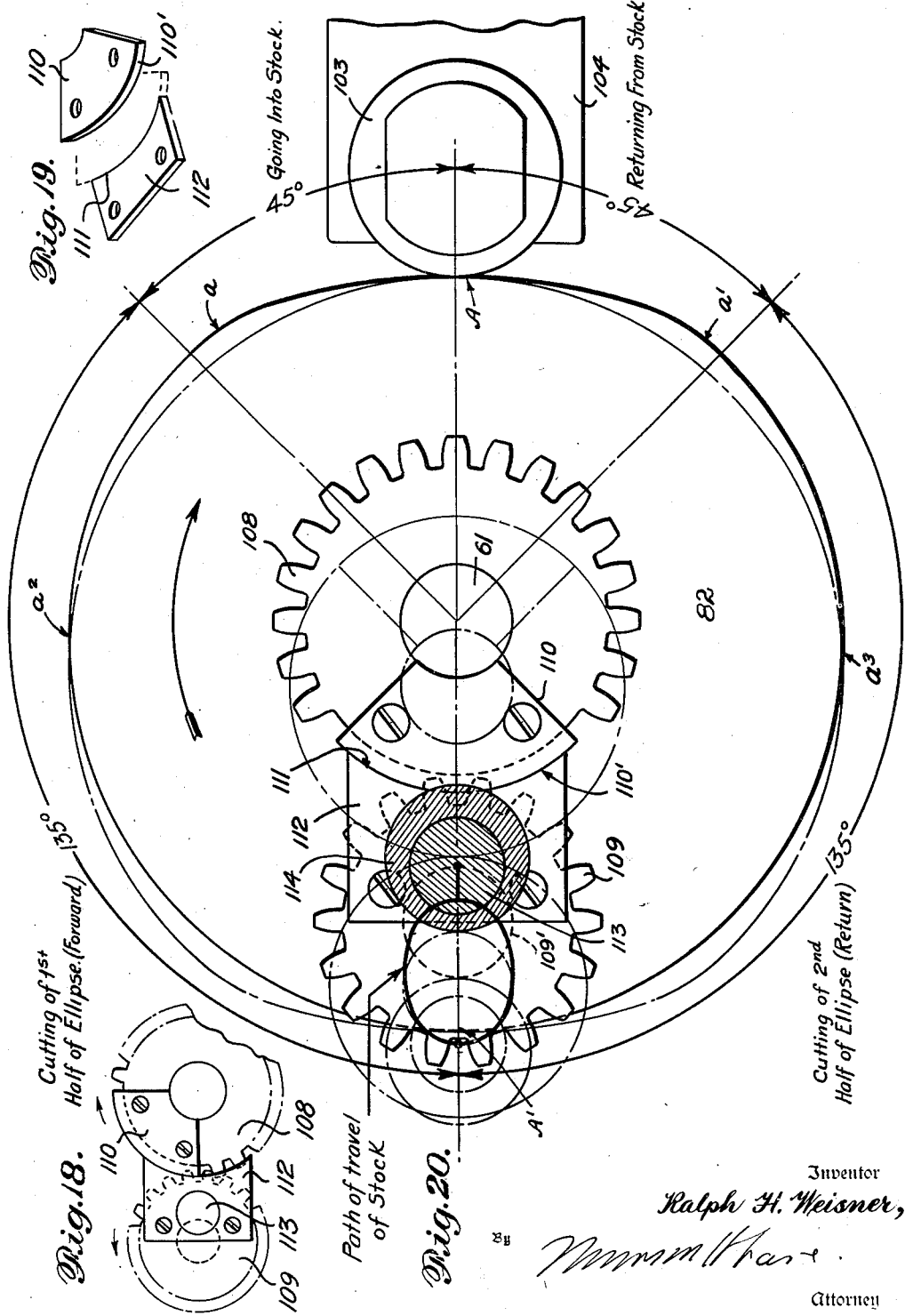

Patented Aug. 12, 1952

2,606,581

UNITED STATES PATENT OFFICE 2,606,581

DOVETAILING MACHINE

Ralph H. Weisner, Greensboro, N. C., assignor to Wysong & Miles Co., Greensboro, N. C.

Application March 11, 1947, Serial No. 733,867

16 Claims. (Cl. 144—87)

This invention relates to wood-working machines of that type adapted for dovetailing or cutting tenons and mortises in the edges of boards or plates, and particularly to machines of such type in which the boards or plates, rested on a gauge for alignment with cutters, are clamped back-to-back in a clamping device carried by a worktable, movable in a closed circular or elliptical path toward and from and about the cutters, whereby a plurality of tenons and intervening mortises are formed in the aligned edges of the clamped boards or plates.

Woodworking machines of the character referred to and to which my invention relates are open to certain objections which my present invention is designed to avoid. In such prior machines, in which the cutters are carried by vertical spindles journaled at their upper and lower ends in tapered bearings, no adequate provision is made for adjusting the spindles and cutters to meet all service requirements, and, on account of the lifting thrust of their driving gears the upper ends of the spindles tend to bind or stick in their upper bearings, causing undue wear upon and heating of the bearings, sometimes requiring stoppage of the machine to correct the difficulty. My invention provides means allowing a wide range of adjustments and a floating motion of the spindles to cure these objections. In prior machines it has been the practice to operate the work clamp manually to clamp and release the stock, and also to operate the worktable manually in connection with guiding means or to operate it automatically by means of complex controlling clutch and controlling cam mechanisms. My invention, on the contrary, provides a machine which is wholly automatic in its stock clamping and releasing and workable feeding operations through the use of a simple, reliable and efficient construction of clamping and clutch devices and/or controlling cam and gear mechanism, whereby the operations of clamping the stock, moving the stock through a prescribed course to form the dovetails, and releasing the stock at the end of a working operation, are performed sequentially and accurately in timed accord with each other. Heretofore it has been customary to dispose the work gauge and to clamp the stock at a point outside or in front of the cutters and to make the initial cut by drawing or pulling the stock rearwardly through the cutters. This is disadvantageous in many respects, among others in that it interferes with the removal of chips and refuse from the cutters and gage, resulting often in imperfect cuts being made and in throwing undue strain on the return spring and causing undue wear and tear on the machine. My invention provides a construction which effectually overcomes these objections and which keeps the gauge and cutters clear of chips and other refuse and renders the working operation easier, so that a weaker return spring may be used to reduce wear. My invention further provides a construction of worktable actuating mechanism which adapts the table to be more easily and accurately operated and guided and which permits of the ready use of different sizes and/or forms of controlling cams for cooperation with different sizes of cutters.

Other objects and advantages of the invention are hereinafter fully described and claimed, or will be apparent from the exemplificative disclosure made in the accompanying drawings, in which:

Fig. 3 is a central vertical longitudinal section through the machine showing the parts in normal position and with two boards placed in the clamp prior to starting the machine for a dovetailing operation;

Fig. 4 is a detail sectional plan view showing the valve of the pneumatic clamp operating device and its controlling means;

Fig. 5 is a vertical section through said valve;

Fig. 6 is a horizontal section on the line 6—6 of Fig. 5;

Fig. 7 is a vertical transverse section taken substantially on the line 7—7 of Fig. 1 through the machine looking toward the front thereof;

Fig. 8 is a rear elevational view of the machine;

Fig. 9 is a vertical longitudinal section on an enlarged scale taken substantially on line 9—9 of Fig. 1, showing particularly the cams and other parts of the clamp operating means and the workable driving and controlling means;

Fig. 10 is a similar view of parts of the single-cycle clutch and the valve and its operating cam of the clamp operating device;

Fig. 11 is a view showing particularly the construction of the dog and its controlling arm of the single-cycle clutch;

Fig. 12 is a vertical section through the forward portion of the machine, showing particularly parts of the cutting mechanism and the clamp, and showing the clamp open and two boards resting on the gauge and in position to be clamped;

Fig. 13 is a vertical section showing the clamped boards on the initial part of their forward movement for the making of the first half of the cut;

Fig. 14 is a similar view showing the boards moved forwardly through the cutters to complete the first half of the cut and as disposed to move across the cutters for the beginning of their return movement to make the second half of the cut;

Fig. 15 is a diagrammatic view of a number of the cutters and the boards arranged as in Fig. 12, and indicating in dotted lines the elliptical orbit of travel of the boards in a dovetailing operation;

Fig. 15a is a similar view with the boards in the relative position shown in Fig. 14;

Fig. 16 is a similar view showing the cutting operation completed;

Fig. 17 is a fragmentary view of one of the boards provided with dovetails as formed by the machine;

Fig. 18 is a plan view of the gears of the intermittent eccentric gearing, showing the primary gear moved out of locking engagement with the secondary gear and the gears in meshing engagement to transmit lateral motion to the work table;

Fig. 19 is a view of the locking plates of said gears;

Fig. 20 is a diagrammatic sectional plan view of the worktable driving and controlling cam and associated parts of the intermittent eccentric gearing, illustrating the operation thereof in a working cycle of the machine.

*The cutting mechanism*

Figure 1:
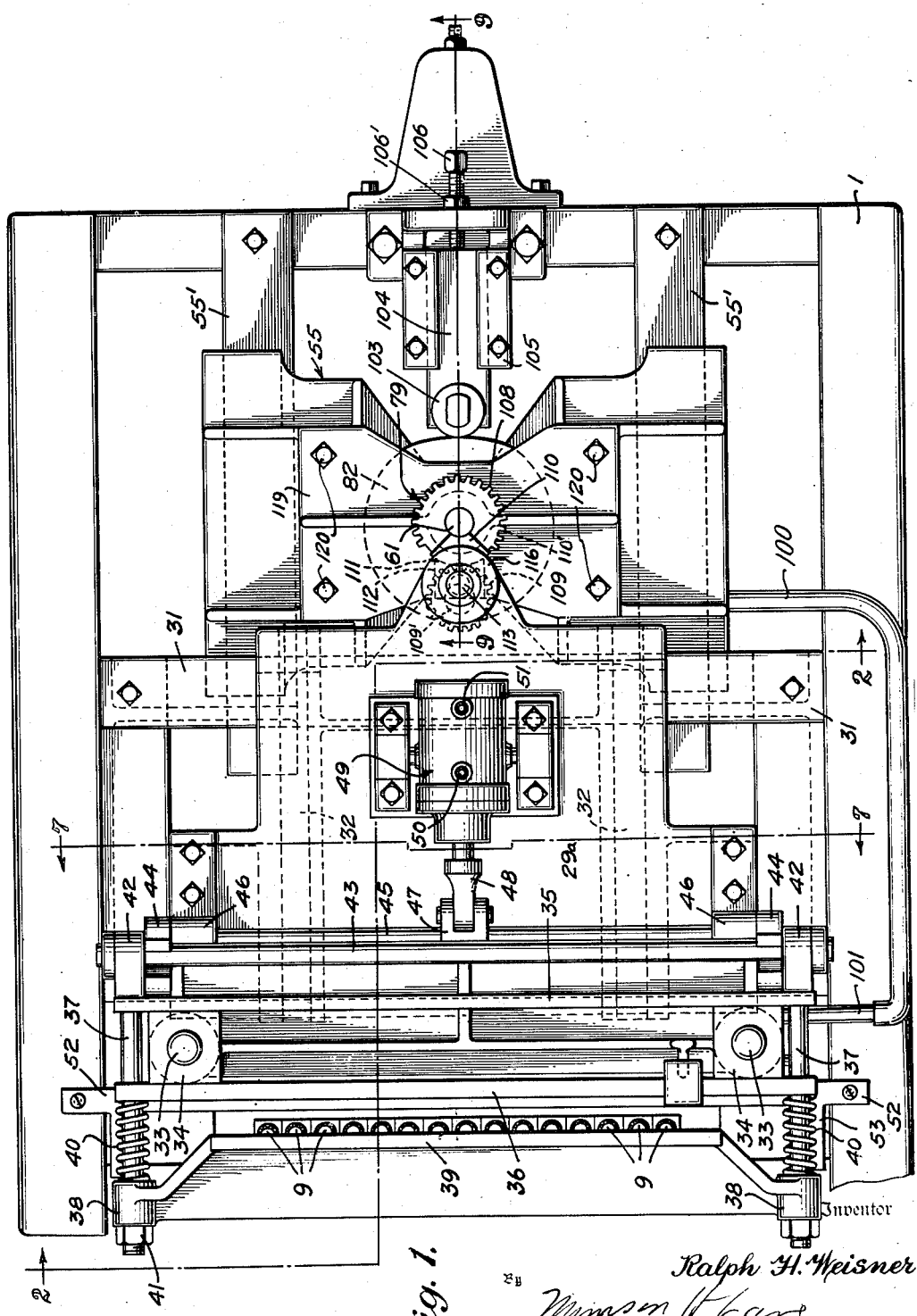
Fig. 1 is a top plan view of the machine with parts arranged in normal position.

Referring now more particularly to the drawings, the numeral 1 represents the main frame of the machine, at the front of which is arranged a frame plate 2 (Fig. 2) having slots 3 therein for the passage of bolts or machine screws 4, whereby vertical adjustment of the plate is permitted and the plate is adapted to be secured in adjusted position to the main frame. This plate carries the cutting devices which are adjustable as a unit therewith by means of adjusting screws 5 mounted on brackets 6 carried by the main frame. The cutting devices consist of a plurality of vertically disposed spindles 7, fifteen in number in the present instance, although a greater or lesser number may be used, each of which spindles is provided with a helical gear 8. The gears of the spindles are preferably arranged in sets, and in staggered order with relation to each other, and the gears of each set mesh together alternately as right and left hand gears. The spindles carry at their upper ends the dovetailing cutter bits 9, said cutter bits having threaded stems 10 (Fig. 12) which fit in threaded sockets 11 in the spindles, their threads being right or left hand threads as required to prevent them from rotating out of the sockets when under cutting pressure. The sets of gears 8 on the spindles mesh with properly arranged helical driving gears 12 on shafts 13 driven by sets of bevel gears 14 on a transmission shaft 14' driven by V-type belts and pulleys 15' from a motor 15 (Fig. 3). The spindle drive gearing above described is a speed step-up gearing for driving the spindles at a desired high speed, as, for example, 4800, more or less, R. P. M.

Figure 2:
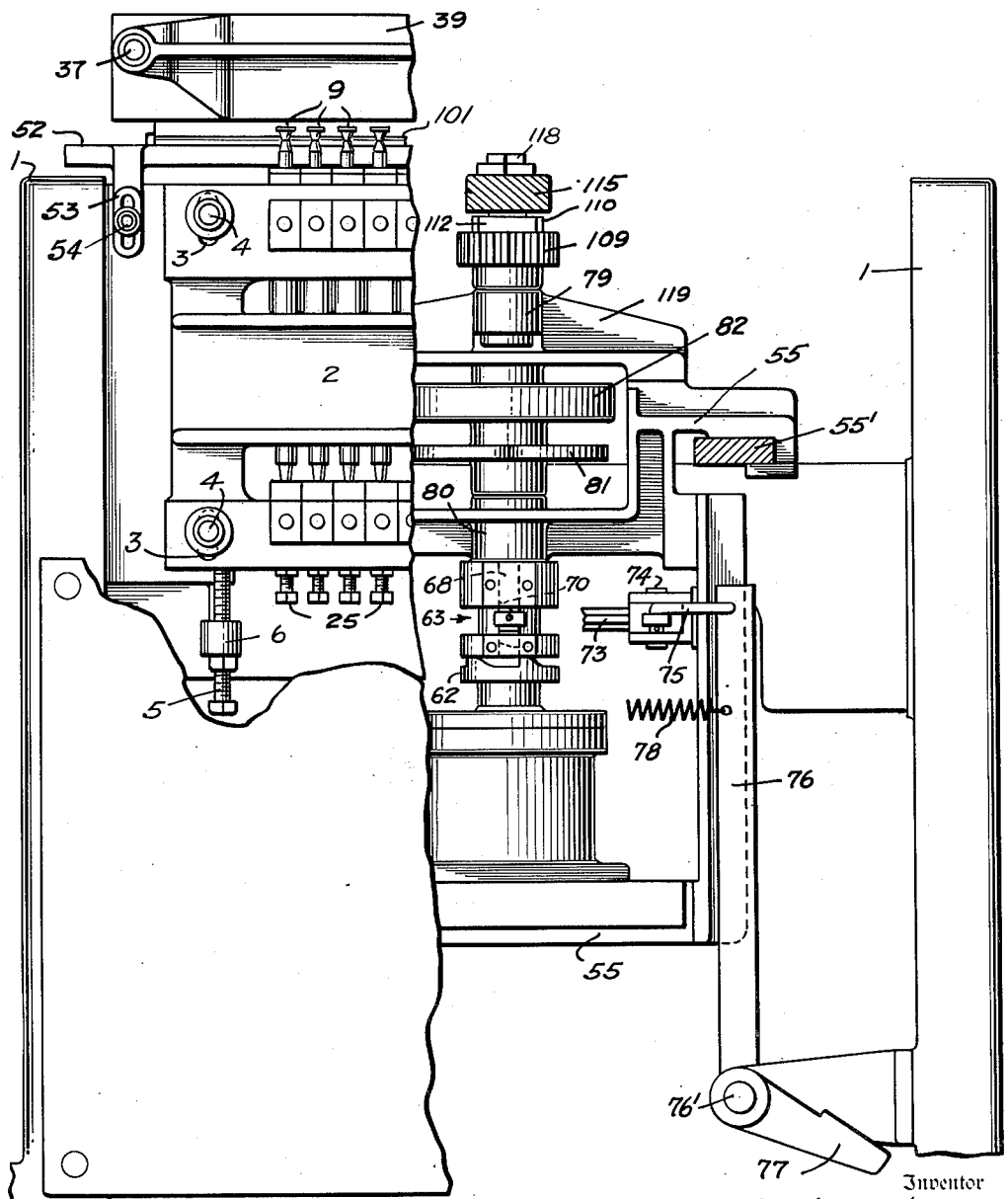
Fig. 2 is a fragmentary view in front elevation and transverse section of a portion of the machine taken on line 2—2 of Fig. 1 and with parts broken away to better show certain features of the invention.

The spindles 7 each have tapered upper and lower ends 16 and 17 journaled in correspondingly tapered bushings 18 and 19 respectively fitted in upper and lower bearings 20 and 21, the tapered form of the bearings permitting take-up adjustment of the spindles to compensate for wear, to cause the spindles to run true, and to accurately position the cutters 9 for operation on the work. The bearings 20 and 21 are secured to the plate 2 to permit adjustment thereof, and adjustment of the entire bank of spindles therewith independent of adjustment of the plate 2, by means of screws 22 passing through slots 23 in the plate 2 and threaded into the bearing members, washers 24 being provided for cooperation with the headed ends of the screws to clamp the bearings in adjusted position. Screws 25, mounted on the plate 2 as shown in Figs. 2 and 12, are provided by means of which the bearings and spindles may be adjusted as a unit on the plate 2. As shown, each spindle rests at its lower end on an antifriction thrust bearing 26 disposed in its bearing 21 and a screw 27 is provided for action on this thrust bearing to adapt the spindle to be independently adjusted. A thrust washer 28, resting on a collar 29 formed on each spindle, is disposed between the collar and the upper bearing member 20 and is normally spaced a slight distance from the bottom of said bearing member. This adapts the upper tapered end of the spindle to fit snugly and without binding in its bushing, so as to permit the spindle to have a certain degree of upward and downward or floating motion, the upward motion being limited by the washer 28. This floating motion of the spindle prevents the spindle from climbing under action of the gears and causing binding of the upper end of the spindle in its bearing and undue heating of the bearing. This is an objection present in prior machines using spindles of this type and which my construction avoids. The floating movement is important, as well as the three distinct adjustments of the spindles, general and micrometric, to take care of all service conditions.

*Work feed and clamping mechanism*

A worktable 29a is provided to feed the stock to the cutters. This table is mounted to travel longitudinally of the machine, or toward and from the cutters, on a slide 30, the slide being mounted for sliding movement on transverse rails 31 arranged to traverse longitudinal rails 32, whereby the table is adapted for universal travel in a horizontal plane and in an elliptical orbit toward and from and about the cutters, as hereinafter more fully described. At the front of the worktable (Figs. 12, 13 and 14) are posts 33 carrying bearing and spacing blocks 34 to which are secured a transverse supporting bar 35 and a stationary work clamping member 36 arranged in advance thereof. Slidably mounted in the bar 35 and clamping member 36 are rods 37, the free ends of which project in advance of the member 36 and through eyes 38 on a movable work clamping member 39. Arranged on the rods between the clamping members are coiled springs 40 (Fig. 1) which normally hold the clamping members 36, 39 spaced a greater distance apart than the thickness of the stock which is to be clamped between them, and which adapt the member 39 to be moved to clamp the stock between it and the stationary member 36. Nuts 41 fitted on the free ends of the rod 37 hold the member 39 from displacement and provide for the adjustment of the springs and member 39 in relation to and for proper coaction with the member 36 to clamp the stock. The rear ends of the rods 37 have eyes 42 or the like which are coupled by a transverse rod 43, with which engage the forked upper ends of actuating arms 44 fixed at their lower ends to a transverse rock shaft 45 journaled in bearings 46 on the table 29a. The rods 37 are thus reciprocated by opposite rocking movements of the arms 44 to move the clamping member 39 toward the clamping member 36 against the resistance of the springs, or to permit movement of the clamping member 39 away from the clamping member 36 by the reaction of the springs. Secured to the rock shaft 45 is also a crank arm 47 pivotally connected to one end of a piston rod 48 of a motor 49 (Figs. 1, 3 and 8) having pipe connections 50 and 51 for alternate supply and exhaust of motive fluid to and from the ends of the cylinder. The motor is supplied with fluid pressure, such as compressed air, from a suitable source to automatically operate the clamping device to clamp and release the work at proper time periods, once on each working cycle of the machine, as hereinafter described. The motor is suitably mounted for rocking movements to accommodate itself to the working arc of its motion transmitting crank arm 47. The work pieces to be clamped between the clamps 36, 39, such as vertically arranged boards or plates A, B, placed back to back, are rested at their lower edges, which are to be dovetailed, on a gauge bar or plate 52 carried by bracket arms 53 (Figs. 2 and 12) adjustably secured by screws to the frame 1, whereby the gauge may be properly positioned as to height relative to the cutters. It is to be noted that this gauge is disposed inside of or in rear of the cutter bits for coaction with the worktable and to enable novel dovetail cutting and chip clearing actions to be obtained, as hereinafter set forth.

*Clamp and worktable operating mechanism*

Supported for travel on rails 55' carried by the frame 1 is a bracket or carriage 55 (Figs. 1, 2, 3 and 8) on which is mounted a motor 56 operating through V-belt and pulley connections 57 to drive a transmission shaft 58. The shaft 58 operates through a worm reduction gearing 59 to drive the shaft 60 of such gearing, which shaft 60 is arranged below and in axial alignment with a table drive shaft 61. Fixed to the adjacent ends of said shafts are clutch members 62 and 63, forming component parts of a single-cycle clutch. The clutch member 62 (Figs. 10 and 11) is provided with spaced teeth 64, while the clutch member 63 is formed with annular ribs 65 and 66 and an intervening groove 67. The ribs 65 and 66 are slotted to form a vertical guideway for a sliding dog 68 having a lower toothed end and formed with a transverse slot 69 provided with an inclined or cam wall portion 70. The clutch member 62 rotates continuously with the lower shaft 60 and is adapted to be engaged by the toothed end of the dog 68 to connect the clutch member 63 therewith and turn the upper shaft 61 through a single revolution on each working cycle of the machine. The slot 69 in the dog is adapted to be engaged by a projection 71 on the latch arm 72 of a bell crank lever (Fig. 2) pivoted at 74 on the frame 1 and connected by a link 75 with the upper end of a trip bar or rod 76 pivoted at its lower end, as at 76', to the frame 1 and connected at its pivoted end to a treadle 77. A spring 78 holds the treadle elevated and the bar 76 in normal vertical position in which, when the shaft 61 is at rest and in starting position, the projection 71 on the latch arm 72 engages the slot 69 in the dog 68 and holds the dog in elevated or retracted position. The machine is started into action by momentarily depressing and then releasing the treadle 77, whereby bar 76 is operated to swing the latch arm 72 away from the dog 68, thus withdrawing the projection 71 from engagement with the slot 69 and allowing the dog to drop into engagement with clutch member 62 to cause rotation of shaft 61. Release of treadle 77 allows spring 78 to return trip bar 76 and latch arm 72 to normal position, in which projection 71 lies in the groove 67 while the clutch member 62 is rotating and until, at the end of a single rotation, projection 71 again enters the slot 69 of the dog and engages the inclined wall 70 thereof, whereupon the dog will be retracted to stop the rotation of shaft 61 in its starting and stopping position or in the position it normally occupies, in readiness for its next succeeding cycle of operation.

The shaft 61 is mounted in bearings 79 and 80 (Figs. 2 and 3) on the carriage 55 and carries a cam 81, controlling the feed of compressed air to and its exhaust from the clamp operating motor 49. Shaft 61 also carries a feed and control cam 82 for moving the worktable 29a forward and backward and causing it to be shifted laterally to properly feed the work pieces in an elliptical path toward and from and about the cutters. Cam 81 comprises a disk having a periphery of circular outline except at one point where it is formed with a cam recess 83 (Fig. 4) adapted to receive a roller 84 on a crank arm 85 (see also Fig. 10), said cam recess having a shoulder 83' at one end to swing the crank arm outwardly and laterally in one direction on each cycle of rotation of shaft 61. Crank arm 85 is connected to the stem 86 of a rotatable disk valve 87 (Figs. 5 and 6) provided with a vertical port 88 extending therethrough, the valve being arranged in a casing 89 supported by the carriage 55. Casing 89 is divided by a horizontal partition 90 into upper and lower chambers 91 and 92, and lower chamber 92 is divided by a vertical partition 93 into left and right compartments 94 and 95. An air supply pipe 96 is connected to upper chamber 91, and the pipes 50 and 51, leading to and from the ends of the motor 49, are connected with the respective right and left compartments 94 and 95 of lower chamber 92. In the partition 90 are vertical ports 97 and 98, respectively, connecting chamber 91 with the said compartments 94 and 95 of chamber 92. The rotatable valve 87 and its actuating arm 85 are normally held by a coil spring 99 in a position in which roller 84 is seated in the recess 83 of cam 81 and in which the vertical port 88 in the valve 87 registers with port 98 in partition 90 connecting compartment 95 with pipe 51, which is the valve position when the worktable is retracted, when the piston of motor 49 is in central or neutral position, and when the work clamp is released, as shown in Figs. 1 and 3. The valve 87 is movable by the rotation of the cam 81 and its action on arm 85 to a different position in which its port 88 registers with port 97 to admit air through pipe 50 to the motor 49 to close the work clamp and cause it to clamp the stock. In this position the valve 87 will be held by the periphery of cam 81 during the working cycle of the machine and until recess 83 again registers with and receives the roller 84. Thereupon the valve is allowed to return to normal position by the action of spring 99, in which position its port 88 again registers with port 98 connecting pipe 51 with the motor 49 to effect retraction of the work clamp for release of the stock and to reset the valve for its next working action.

Communicating with the upper valve chamber 91 is a pipe 100 which leads therefrom to a transverse cleaner or blast pipe 101 supported by the worktable and located in rear of the gauge 52 and provided with ports 102 (Figs. 12, 13 and 14) for discharging streams of air across the upper surface of the gauge and against the cutter bits at the end of each dovetail cutting operation and removal of the cut boards from the clamp. The air employed for this purpose may be air from the supply pipe or air exhausting from the cylinder 49 through pipes 50 and 51. The described relative arrangement of the cutter bits, gauge and cleaner gives material and important advantages over prior constructions in the cutting of the dovetails and removal of chips and dust, as hereinafter set forth.

The worktable feed and control cam 82 (Figs. 1, 3 and 9) is keyed to the shaft 61 between the cam 81 and bearing 79 and is generally of elliptical form. It has a low portion A (Fig. 20) located at a minimum distance from its axis, a diametrically opposite portion A' in its center line located at a greater distance from its axis, cam portions $a$, $a'$ arranged adjacent to and lying on opposite sides of the portion A, whose crests are located at a major distance from its axis, and portions $a^2$, $a^3$ extending on elliptical lines between the portions $a$, $a'$ and the portion A'. The periphery of this cam is arranged to bear against a stationary abutment roller 103 carried by a bracket 104 slidably mounted in a guideway 105 at the rear of the frame 1 and adapted to be held in a fixed working position by means of a screw 106 and check nut 106'. By means of this screw and nut the roller 103 may be adjusted to compensate for wear or to regulate the distance of the carriage from the cutters and then be fixed in adjusted position. Rotation of the cam in contact with the roller causes forward movement of the carriage for movement of the worktable to carry the stock to the cutters and permits of the movement of the worktable to carry the stock around the cutters and its return with the carriage back to normal position. A spring 107 connected to the frame 1 and to the bearing 80 is tensioned by the forward movement of the carriage to return the same and the worktable to normal position at the end of each working cycle of the machine.

A lost-motion intermittent eccentric gear connection between the shaft 61 and the worktable is provided for transmitting feed motion from said shaft and the cam 82 to the worktable to secure a forward feed motion of the worktable to bring the work pieces up to and into engagement with the cutters. The movement is first on a straight line and then on a curved or partly elliptical line, to form one side of the tenon, with a dwell in the first part of the straight line movement to allow action of the clamp to clamp the work pieces before the cutting operation begins, followed by a backward feed motion of the worktable and the reversal of these operations in sequence to cut the opposite side of the tenon during the return travel of the worktable to normal position and its stoppage at the end of its working cycle, at which time the cut work pieces are released by the clamp.

This lost-motion intermittent eccentric gear connection comprises a primary mutilated spur gear 108 (Figs. 1 and 9) keyed to the shaft 61 and a secondary spur gear 109 carried by an axle pin 109' journaled in the bearing 79 alongside of and parallel with the shaft 61. Secured to the mutilated gear 108, in the gap or space between its terminal teeth, is a segmental plate 110 (see also Figs. 18, 19 and 20) having an arcuate surface 110' movable across and in contact with the correspondingly shaped concaved or recessed edge 111 of a plate 112 secured to the gear 109. These coacting plates form a locking connection between the two gears 108 and 109 to which they are secured to hold the gear 109 from rotation and to lock the worktable from lateral motion during the initial or idle part of the rotation of gear 108 and until its teeth come into mesh with the teeth of gear 109, so that at the start while gear 108 is rotating with shaft 61 and the worktable is on the preliminary part of its forward travel in a straight line no motion will be transmitted to gear 109. The gear 109 has threadedly connected therewith a crank or eccentric pin 113 mounted in an eccentric sleeve 114 rotatable in a bearing 115 provided therefor in a bracket portion 116 at the rear end of the worktable. Through this gearing motion resulting from the rotation of the cam 82 is transmitted to the worktable 29a to feed it forward or to permit it to be drawn backward by the spring 107, as well as to permit the worktable to be moved sidewise by the action of the eccentric gear 109, pin 113 and sleeve 114, when gear 109 is rotated by gear 108, so that the worktable will travel in a substantially elliptical path on each of its working cycles. The sleeve 114 bears at its lower end on plate 112 and is provided at its upper end with a flange 117 engaged by the head 118 of the pin 113 whereby the sleeve is clamped in position. This construction allows adjustment of the sleeve in an obvious manner to micrometrically vary the throw of the crank or eccentric connection.

It will be understood from the foregoing that the bracket or carriage 55 and parts carried thereby are slidable forwardly and backwardly as a unit on the track rails 55'.

*Operation of the machine*

The normal positions of the various working parts are particularly shown in Figs. 2, 3 and 12. In Figs. 3 and 12, the clamp is shown open so that the work pieces A, B, arranged back-to-back, may be inserted downward between the clamping members 36 and 39, to rest at their lower end edges which are to be dovetailed on the gauge 52 in rear of the cutters 9. The work pieces having been placed in position ready to be clamped, the operator sets the machine into action by depressing and then releasing the treadle 77 (Fig. 2) which trips the clutch 62, 63, 68 to couple the shaft 61 to the constantly driven shaft 60 for one rotation only. At the start of rotation of shaft 61 cam 81 is turned to move recess 83' out of engagement with roller 89 and to actuate arm 85 and valve 87 for the flow of motive fluid through pipe 50 to the left hand end of cylinder 49 to move clamping member 39 to clamp the work pieces against the clamping member, in which position the member 39 is held during the entire cycle of operation of the machine by the periphery of cam 81. At the end of a complete revolution of the cam 81 the roller 84 again drops into recess 83' and allows the valve 87 to be returned to its normal position. On the movement of the valve 87 back to its normal position, which occurs at the limit of the return movement of the worktable back to normal position after the dovetails have been formed in the work pieces, motive fluid flows through pipe 51 to the right hand end of the cylinder 49 to move the piston therein forwardly, whereby the clamping member is released and releases the work pieces A, B. At the same time air passes through pipe 100 to cleaner pipe 101 to discharge air across the gauge 52 from which the work pieces have been removed to blow away all dust, dirt and chips so that no refuse will be left to prevent accurate seating of the next pair of work pieces to be cut on the gauge.

It will be observed that in my construction of machine the gauge is arranged in rear of the cutter bits and the cleaner pipe in rear of the gauge, and that in a cutting action the worktable moves forward to a position in which the work pieces are clamped, and then continues its forward movement while it is at the same time being moved in a curved line, to push the work pieces forward through the cutters for the formation of adjacent sides of adjoining dovetails and a mortise therebetween. This action is permitted by the described arrangement of the gauge, cleaner and clamp relative to the cutters and the working action of the carriage, as the way is left clear in front of the cutters for the free and unimpeded forward movement of the work pieces through the cutters and around the cutters and for backward travel of the work pieces through the cutters, and it will be seen that full exposure of the gauge and cutters after each cut and removal of the work pieces is made for the action of the air blast to blow away all chips and refuse. The arrangement of the aforesaid parts and feed motion of the stock is thus reverse to that employed in prior machines in which the gauge, cleaning means and clamp are normally disposed in front of the cutters and the initial cut to form one half of each dovetail is effected by drawing movement of the stock backward through the cutters. This novel arrangement of the parts not only facilitates removal of chips or other refuse interfering with the cutting action and insures a more perfect and true cutting action, as the cutters are always kept clear, but avoids any liability of any pieces of trash collecting on the gauge and causing misalignment of the stock and an imperfect cut being made. Another advantage is that less tension on the return spring is required to energize it for the return motion, which begins after the greater amount of the cutting work has been done, thus eliminating much pressure or strain and reducing wear on the machine.

In its working motion the worktable first moves forwardly on a straight center line to a point bringing the stock into contact with the cutters, as shown in Fig. 13, during which period the stock is clamped before it engages the cutters and the worktable is locked against lateral motion by the intermittent eccentric gearing which controls its lateral movements to the extent allowed by the cam 82. At the moment the stock contacts with the cutters, however, the worktable is released for lateral motion by the action of the intermittent gearing, after which the worktable is controlled by the cam 82 to move the stock in an elliptical path forwardly through the cutters, thence transversely across the front of the cutters and thence backward through the cutters, the orbit of travel of the stock being substantially elliptical, as indicated at $A^2$ in Figs. 15 and 15a, forming substantially semielliptical tenons $A^3$ and intervening mortises $A^4$ in each work piece, as shown in Figs. 16 and 17. Fig. 15 diagrammatically shows the cutters and stock and starting position and the orbit of travel of the stock. Fig. 15a shows the stock at the forward portion of its travel, in which one-half of the cut has been made and the stock is beginning its backward movement for the completion of the cut. Fig. 16 shows the stock at the end of the return motion and with the tenons $A^3$ and mortises $A^4$ completely formed. Fig. 17 shows a portion of a work piece with the formed tenons and mortises, the view being in plan or side elevation looking toward the flat faces of the tenons.

Fig. 20 is a diagrammatic plan view, partly in section, showing the form and illustrating the action of the cam 82 and movements of the stock it effects and permits in conjunction with the intermittent eccentric gearing. The cam 82 is here shown in normal or starting position and the gears 108 and 109 are shown with their plates 110, 112 in position to lock the gear 112 against rotation and the worktable against transverse movements. Cam 82 here engages roller 103 at its low point A, and the parts are in the position they occupy when the worktable is retracted. On the first part of the initial 45° angle in the orbit of rotation of the cam a part of surface $a$ engages the roller 103 and moves the worktable forward to bring the stock into contact with the cutters, during which part of the movement gears 108, 109 remain locked and the worktable travels in a straight line. During this period also the pneumatic clamping mechanism controlled by cam 81 operates to clamp the stock. At the end of such period, however, gear 108 releases gear 109 and the eccentric gearing is allowed to function to shift the worktable laterally to degrees controlled by the cam 82. From such point on part $a$ of cam 82, as the remainder of part $a$ and the adjacent cam surface of the cam 82 travel through the 135° arc up to point A' in contact with the roller 103, the worktable is moved forward and laterally to push the stock in a semielliptic path through and part way across the outer sides of the cutters to complete one-half of the cut, at which time the cam 83 will have made one-half of its revolution. On the second half of the revolution of the cam the stock is pulled backward through the cutters and the operations sequentially reversed until the parts, as shown in Fig. 20, are returned to normal position, the worktable retracted and the intermittent eccentric gearing relocked in an obvious manner. In this return movement of the parts the clamp is opened to release and allow removal of the dovetailed stock and to operate the cleaner for the removal of the cuttings, etc., the machine being reset for a succeeding operation, when fresh stock to be cut is supplied and the treadle 77 again tripped.

The upper bearing 79 for shaft 61 is attached to or forms part of a bracket plate 119 (Figs. 1, 2 and 8) secured to the carriage 55 by four screws 120 so that on detachment of the pin 113 and removal of said screws the plate, bearing and intermittent eccentric gears may be removed from engagement with shaft 61 to permit removal of cam 82 and the substitution of a new cam or a cam of different dimensions. This allows change of cams to suit different thicknesses of stock to be cut or sizes of cutters used.

It will be seen from the foregoing description that, with the exception of the insertion and removal of the stock and tripping of the treadle 77, the machine is entirely automatic in operation with regard to the clamping and releasing of the stock, the movements of the worktable and cooperating parts for the dovetailing actions, and the operation of clearing means, with the result of producing a machine which is labor saving and does better work and has other substantial advantages over prior constructions of machines of this character. It is to be understood that while a preferred form of machine for carrying the invention into practical effect is herein shown, changes in the form, construction and arrangement of parts, falling within the scope of the appended claims, may be made without departing from the spirit or sacrificing any of the advantages of the invention.

Having thus described my invention, I claim:

1. A woodworking machine for cutting tenons in stock comprising a rotary cutter, a stock clamping device, power means to operate the clamping device, a worktable carrying the clamping device, a driving shaft, a motor, a single-cycle clutch for coupling the shaft to the motor, automatic means for throwing the clutch into and out of action, cam means actuated by the driving shaft for controlling the clamping device to cause it to clamp the stock and release it at the beginning and end respectively of a working cycle of the shaft, separate means actuated by the driving shaft for moving the worktable to move the stock initially forward, then in a substantially elliptical orbit about the cutter, and then rearwardly, and locking means for preventing lateral movement of the table during the initial and final parts of the movement.

2. A woodworking machine for cutting tenons in stock including, in combination, a rotatable cutter, stock carrying means having a clamp to clamp the stock, a driving shaft, automatic means controlled by the shaft for operating the clamp in timed sequence to respectively clamp and release the stock before and after a cutting operation, and means including an eccentric and a cam coacting therewith for moving and guiding the stock-carrying means to carry the clamped stock initially forward, then in a substantially elliptical orbit about the cutter, and then rearwardly, and locking means for preventing lateral movement of the stock carrying means during the initial and final movements.

3. A woodworking machine for cutting tenons in stock including, in combination, a rotary cutter, a clamp for clamping the stock, power means for operating the clamp, a worktable universally movable in a horizontal plane and carrying the clamp, a driving shaft, a driven shaft, means including a pair of cams on the driven shaft for operating the worktable and controlling the clamp in timed sequence to start the worktable in feed motion, actuate the clamp to clamp the stock on the initial part of the feed motion, and then continue the feed motion to move the stock in a substantially elliptical orbit about the cutting means, and an eccentric gear connection between the shaft and worktable for laterally moving the worktable except when the clamp is being operated to clamp the stock.

4. A woodworking machine for cutting tenons in stock including, in combination, a frame, a rotary cutter, a clamp for clamping the stock, power means for operating the clamp, an abutment on the frame, a worktable universally longitudinally and laterally movable in a horizontal plane and carrying the clamp, a driving shaft, a driven shaft, means for operating the worktable and controlling the clamp in timed sequence to start the worktable in feed motion, actuate the clamp to clamp the stock on the initial part of the feed motion, and then continue the feed motion to move the stock in a substantially elliptical orbit about the cutter, said last named means comprising clamp operating means controlled by the driven shaft, a cam on the driven shaft engageable with the abutment and operative to move the table longitudinally in one feed direction and permit of its longitudinal return motion and guide it in its lateral movement, an eccentric gearing for laterally moving the table and having means for locking it from action while the clamp is being operated to clamp the stock, and a spring interposed between the frame and worktable for imparting return motion to the worktable.

5. A machine for cutting tenons in stock including, in combination, a rotatable cutter, means comprising a worktable for supporting and moving the stock into and out of contact with the cutter, said means being capable of universal movement in a plane substantially at right angles to the longitudinal axis of the cutter, motor actuated means to move said stock-supporting means initially forward in a rectilinear path to carry the stock toward the cutter, then in a substantially elliptical orbit to perform a tenon cutting operation, stock clamping means carried by said stock-supporting means, power mechanism actuated in a predetermined time sequence relative to the means for moving the stock-supporting means and adapted to operate the stock clamping means during the initial forward movement, and locking means to prevent lateral motion of the worktable during said initial forward movement.

6. A machine for cutting tenons in stock including, in combination, a rotatable cutter, means including a worktable for supporting and moving the stock into and out of contact with the cutter, said means being capable of universal movement in a plane substantially at right angles to the longitudinal axis of the cutter, power means to move said worktable initially forwardly in a rectilinear path to carry the stock toward the cutter, then in a substantially elliptical orbit, stock clamping means carried by said worktable, a second power means to operate the stock clamping means, mechanism to interconnect the two power means to effect stock clamping and releasing in timed relation to the movement of the worktable, and means for locking said worktable against lateral movement during said initial forward movement.

7. A machine for cutting tenons in stock comprising a rotatable cutter, a universally movable worktable adapted to support and move stock into and out of operative engagement with the cutter, stock clamping means carried by the stock supporting table, power means including a fluid motor for actuating said stock clamping means, separate power means for actuating the worktable, blower means carried by the worktable and having an outlet directed toward the cutter, fluid pressure lines supplying said nozzle and said fluid motor, and means including a valve interposed in said fluid pressure lines and controlled by the table actuating power means for operating said clamping means and said blower in timed relation to the movement of the worktable.

8. A machine as set forth in claim 7 wherein the blower is actuated at the end of the cutting operation.

9. A woodworking machine for cutting tenons in stock including, in combination, a rotary cutter rotatable on a vertical axis, a clamp for clamping the stock, a worktable reciprocable and laterally movable in a horizontal plane and carrying the clamp, a driving shaft, means, including a cam driven by the shaft, for initially operating the worktable rectilinearly to start the worktable in feed motion to carry the stock toward the cutter and for subsequently continuing the feed motion of the worktable to move the stock in a substantially elliptical orbit about the cutter, and finally returning the worktable to its initial position in a rectilinear path, power-driven means acting in timed sequence with the worktable to actuate the clamp to clamp the stock on the initial part of the feed motion of the worktable, and means to hold the worktable from lateral motion during said initial and final parts of the feed motion.

10. A woodworking machine for cutting tenons in stock including, in combination, a rotatable cutter, means for clamping the stock and carrying it in a substantially elliptical orbit about the cutter, a drive shaft, means operated by said shaft and including a cam to effect longitudinal movement of the stock clamping and carrying means in one direction and to permit its longitudinal return movement and lateral movements for travel of the stock in said orbit, a primary mutilated gear also actuated by the shaft, a secondary gear adapted to mesh at times with the primary gear and having a connection with the stock clamping and carrying means to move the latter laterally, a locking means to hold the secondary gear against movement during part of one revolution of the primary gear and until the gears mesh, and means interposed between the drive shaft and the parts operated thereby to effect a single orbital movement of the stock clamping and releasing means accompanied by a clamping of the stock prior to cutting and a release thereof after cutting.

11. A woodworking machine for cutting tenons in stock including, in combination, a cutter, a clamp for clamping the stock, a worktable universally movable in a single plane and carrying the clamp, means for operating the worktable to start the worktable in feed motion toward the cutter and for subsequently continuing the feed motion of the worktable to move the stock in a substantially elliptical orbit about the cutter and finally returning the worktable to its initial position in a rectilinear path, power means to actuate the clamp in timed sequence with reference to the movement of the worktable to clamp the stock on the initial part of the feed motion of said table, said clamp actuating means operating the clamp to release the stock after cutting is completed, and means for locking the table against lateral movement during the initial and final stages of the feed motion.

12. A woodworking machine for cutting tenons in stock comprising a plurality of vertical, parallel rotary cutters, a stock clamping device, a stationary gauge on which the stock is adapted to rest prior to clamping, a worktable carrying the clamping device, the gauge and clamping device being arranged respectively to support and clamp the stock while vertical and substantially parallel to the longitudinal axes of the cutters, power means for operating the clamping device to clamp the stock, and other power means for initially moving the worktable rectilinearly to feed the clamped stock toward the cutters and then laterally in a substantially elliptical orbit about the cutters, and means for locking the worktable against lateral movement during the initial part of the feed motion.

13. A woodworking machine for cutting tenons in stock including, in combination, a plurality of rotatable, parallel cutters, a worktable movable universally in a plane at right angles to the plane of the longitudinal axes of the cutters, a clamp carried by the worktable to clamp the stock, fluid pressure means including a piston, a cylinder in which the piston reciprocates, and a valve controlling the piston, means connecting the piston to the clamp to operate the same to clamp and release the stock before and after a cutting operation, means for initially moving the worktable rectilinearly to carry the clamped stock toward the cutters then in a substantially elliptical orbit about the cutters and finally away from the cutters, means for operating said valve in timed sequence with the worktable moving means, and locking means for clamping the worktable against lateral movement during the initial and final stages of movement.

14. A woodworking machine for cutting tenons in stock including, in combination, a rotatable cutter, a clamp for clamping the stock, a drive shaft, mechanism controlled by the drive shaft for closing and opening the clamp, means including a worktable for supporting the clamp with the stock therein, means operated by the shaft to effect longitudinal movement of the clamp-supporting means in one direction and to effect lateral movements and longitudinal return movement to cause the stock to move in a substantially elliptical orbit about the cutter, and eccentric means actuated by the shaft to move the clamp and its supporting means laterally and locking means to render the eccentric means inactive while the clamp is clamping the stock to prevent lateral movement of the worktable during the clamping operation.

15. A woodworking machine for cutting tenons in stock comprising, in combination, a rotary cutter, a clamp for clamping the stock, power means for operating the clamp, a worktable universally movable in a horizontal plane and carrying the clamp, a power shaft, means for operating the worktable and controlling the clamp in timed sequence to start the worktable in feed motion, actuate the clamp to clamp the stock on the initial part of the feed motion, and then continue the feed motion to move the stock in a substantially elliptical orbit about the cutting means, means comprising an eccentric gear connection between the shaft and worktable for laterally moving the worktable except when the clamp is being operated to clamp the stock, and means for locking the table against lateral movement while the clamp is being operated to clamp the stock.

16. A woodworking machine for cutting tenons in stock including, in combination, a rotary cutter, a clamp for clamping the stock, power means for operating the clamp, a worktable universally longitudinally and laterally movable in a horizontal plane and carrying the clamp, a power shaft, means for operating the worktable and controlling the clamp in timed sequence to start the worktable in feed motion, actuate the clamp to clamp the stock on the initial part of the feed motion, and then continue the feed motion to move the stock in a substantially elliptical orbit about the cutter, said last-named means comprising clamp operating means controlled by the power shaft, a cam on said shaft engageable with a fixed abutment and operative to move the table longitudinally in one feed direction and permit of its longtiudinal return motion and guide it in its lateral movement, an eccentric gearing for laterally moving the table and having means for locking it from action while the clamp is being operated to clamp the stock, and means for imparting return motion to the worktable.

RALPH H. WEISNER.

REFERENCES CITED

The following references are of record in the file of this patent:

UNITED STATES PATENTS

| Number | Name | Date |
|---|---|---|
| 207,640 | Barnes | Sept. 3, 1878 |
| 364,635 | Dodds | June 14, 1887 |
| 946,811 | Thomas et al. | Jan. 18, 1910 |
| 1,095,041 | Strozier | Apr. 28, 1914 |
| 1,258,082 | Anderson | Mar. 5, 1918 |
| 1,809,773 | Cain | June 9, 1931 |
| 2,005,647 | Crouch | June 18, 1935 |
| 2,225,263 | Farrell | Dec. 17, 1940 |
| 2,260,662 | Farrell | Oct. 28, 1941 |
| 2,299,602 | Teague | Oct. 20, 1942 |
| 2,314,179 | Teague | Mar. 16, 1943 |